June 5, 1962    R. G. QUINN    3,037,895
REINFORCED PIPE LINE FELT
Filed Aug. 9, 1957
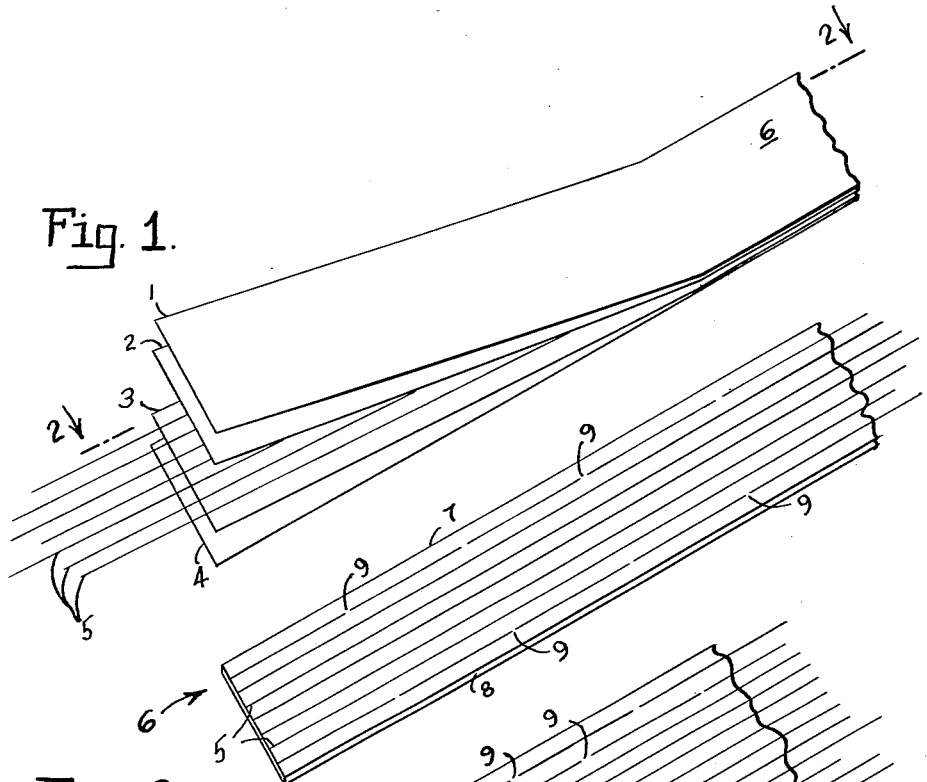
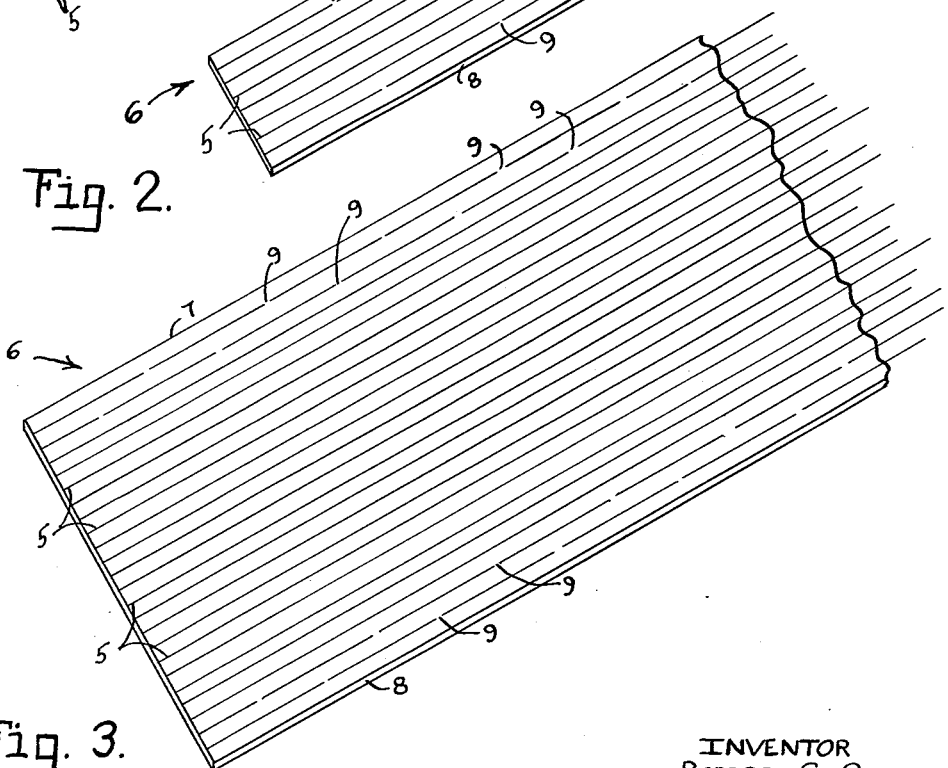
INVENTOR
ROBERT G. QUINN
BY
John A. McKinney
ATTORNEY

United States Patent Office 3,037,895
Patented June 5, 1962

---

3,037,895
REINFORCED PIPE LINE FELT
Robert G. Quinn, Bound Brook, N.J., assignor to Johns-Manville Corporation, New York, N.Y., a corporation of New York
Filed Aug. 9, 1957, Ser. No. 677,354
2 Claims. (Cl. 154—44)

This invention relates to a pipe line felt reinforced with continuous glass strands and more particularly to an improved felt and a method of making the felt so that the edge portions of the felt may be elongated.

A glass reinforced pipe line felt is usually applied to a pipe over a coating of hot enamel and is wrapped around the pipe in a spiral path which utilizes a conventional lap joint. The dielectric strength of the coating is dependent upon an even layer of the enamel and the felt. Since the glass strands at the edge of the felt and therefore, on the lap, have no appreciable elongating characteristics, the enclosed enamel is squeezed out resulting in an uneven enamel coating. This effectively lowers the dielectric strength. The difficulty is eliminated by the felt of the instant invention wherein the glass strands adjacent the edges of the felt are broken at spaced intervals so that the felt along its edge portions will have an appreciable elongation characteristic.

It is the primary object of this invention to provide a glass reinforced pipe line felt in which the longitudinal edges can be elongated.

It is a further object of this invention to provide a method for making a reinforced pipe line felt that allows for elongation of the longitudinal edges of said felt.

The invention will be more fully understood and further objects and advantages thereof will become apparent when reference is made to the following detailed description of a preferred embodiment of the invention and the accompanying drawings in which:

FIG. 1 is a pictorial view showing the formation of a pipe line felt;

FIG. 2 is a section taken on the plane passing through the line 2—2 of FIG. 1; and FIG. 3 is a sectional view similar to that of FIG. 2 but illustrating a wider felt.

Referring to the drawing, there is disclosed in FIG. 1 the general formation of a pipe line felt. A plurality of asbestos felts or papers 1, 2, 3 and 4 are gradually brought into position to be laminated by press rolls (not shown). Reinforcing means consisting of a plurality of continuous glass strands 5 are introduced between the papers 2 and 3 during the process of lamination. The glass strands 5 are spaced approximately ¼" apart. After the papers 1–4 and the glass strands 5 have been laminated into one reinforced pipe line felt 6, it is passed through a bath (not shown) where it is saturated with approximately 25–35 percent of a bituminous impregnant.

In FIG. 2, there is shown a reinforced pipe line felt 6 with the glass strands 5 running parallel to the longitudinal edges 7 and 8. The glass strands 5 adjacent edges 7 and 8 are broken at spaced intervals 9 so that the edge portions of the felt 6 may be elongated. These intervals 9 are spaced, in accordance with the desired degree of elongation, usually from 2–12 inches apart. As the width of the felt 6 increases, the number of broken strands 5 increases. This is illustrated in FIG. 3 wherein a wider felt 6 has the two strands 5 nearest each edge 7 and 8 broken at the spaced intervals 9. The breaking of the stands 5 only slightly impairs the tear resistance of the felt and this may be minimized by staggering the intervals in the adjacent strands 5 as shown in FIG. 3. As illustrated in the drawings, the felts have a thickness which of the average felt is approximately .025 of an inch.

In the application of the felts 6 in protection of pipe lines, the felt is wrapped spirally over a coating of hot enamel to combine with the enamel in protecting the pipe line from corrosion. The effectiveness of this protection is directly responsive to the dielectric strength of the coating. When the reinforcing felt 6 is applied to the pipe, a conventional lap joint is employed. The intervals 9 in the strands 5 allow the edge portions 7 and 8 to elongate so that the felt 6 may be applied with even pressure since the felt will be able to elongate to conform to the greater diameter at the lap. This elongation allows an even enamel coating to be maintained around the pipe, and thus, the full dielectric strength is retained.

The intervals 9 in the strand 5 may be formed in any desired manner. A suggested method is to break or shatter the strands 5 during the slitting and rewinding operation. The felts 6 are manufactured in widths varying from 3 to 4 feet which are then slit to a desired usable felt width of 1 to 12 inches and then wound on spools. The shattering or breaking may be accomplished by a gear having teeth spaced at the desired interval rotating against the felt when it is supported on a solid backing roll. Although described in connection with an asbestos reinforced pipe line felt, it is understood that the invention may be employed wherever it is desirous to impart an elongation characteristic to the edges of a reinforced felt.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:

1. A method of making a reinforced pipe line felt having longitudinal edges at least one of which may be elongated comprising laminating a plurality of asbestos papers to form a pipe line felt, imbedding a plurality of continuous glass strands between adjacent inner papers so that said glass strands extend generally parallel to said longitudinal edges, and breaking at least one of said strands adjacent at least one of said edges at spaced intervals.

2. A reinforced pipe line felt comprising a plurality of asbestos papers laminated to form a pipe line felt having longitudinal edges, a plurality of rows of continuous glass strands in said felt extending generally parallel to said longitudinal edges, a discontinuous glass strand in said felt adjacent at least one of said longitudinal edges and parallel thereto, said rows of continuous glass strands and said discontinuous glass strand being imbedded between adjacent inner papers.

References Cited in the file of this patent

UNITED STATES PATENTS

| | | |
|---|---|---|
| 2,202,014 | Lougheed | May 28, 1940 |
| 2,633,440 | Scholl | Mar. 31, 1953 |
| 2,731,066 | Hogendobler et al. | Jan. 17, 1956 |
| 2,739,092 | Stevenson | Mar. 20, 1956 |
| 2,753,284 | Pahl et al. | July 3, 1956 |
| 2,897,841 | Wai Hui et al. | Aug. 4, 1959 |